US012571457B2

(12) United States Patent
Nishii

(10) Patent No.: US 12,571,457 B2
(45) Date of Patent: Mar. 10, 2026

(54) ACTUATOR, AND ROBOT, BRACE, AND HAPTIC DEVICE INCLUDING THE SAME

(71) Applicant: TOYOTA JIDOSHA KABUSHIKI KAISHA, Toyota (JP)

(72) Inventor: Kazutoshi Nishii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/917,377

(22) Filed: Oct. 16, 2024

(65) Prior Publication Data

US 2025/0172198 A1     May 29, 2025

(30) Foreign Application Priority Data

Nov. 27, 2023    (JP) .................................. 2023-199767

(51) Int. Cl.
*F16H 19/06* (2006.01)
*B25J 9/10* (2006.01)

(52) U.S. Cl.
CPC .......... *F16H 19/0654* (2013.01); *B25J 9/104* (2013.01)

(58) Field of Classification Search
CPC ............................. F16H 19/0654; B25J 9/104
See application file for complete search history.

(56) References Cited

U.S. PATENT DOCUMENTS

| | | | | |
|---|---|---|---|---|
| 4,593,571 A * | 6/1986 | Schwarz | ............. | F16H 19/0622 74/89.2 |
| 4,843,921 A * | 7/1989 | Kremer | ..................... | A61F 2/54 74/89.2 |
| 9,574,646 B1 * | 2/2017 | Edsinger | ................. | F16H 21/16 |
| 11,396,931 B2 * | 7/2022 | Ewaldsson | .......... | F16H 19/0654 |
| 2009/0249903 A1 * | 10/2009 | Godler | ............... | F16H 19/0654 74/89.2 |
| 2018/0085277 A1 * | 3/2018 | Julin | ...................... | A61F 5/0102 |
| 2022/0049760 A1 * | 2/2022 | Shin | ......................... | B25J 9/102 |

* cited by examiner

*Primary Examiner* — Minnah L Seoh
*Assistant Examiner* — Gregory T Prather
(74) *Attorney, Agent, or Firm* — Oliff PLC

(57) ABSTRACT

An actuator includes: a plurality of wires, one end of each wire of the plurality of wires being engaged with a load; a support member, another end of each wire of the plurality of wires being fixed to the support member; and a drive source configured to rotate the support member, to thereby twist the plurality of wires together, the actuator being configured to change a distance between the support member and the load in accordance with the rotation of the support member. Each of the plurality of wires is fixed to the support member in a state in which the plurality of wires are twisted in advance in the same twist rotation direction, and when the distance between the support member and the load is reduced, the plurality of wires are rotated in a rotation direction the same as the twist rotation direction and then twisted together.

6 Claims, 6 Drawing Sheets

ACTUATOR, AND ROBOT, BRACE, AND HAPTIC DEVICE INCLUDING THE SAME

CROSS REFERENCE TO RELATED APPLICATIONS

This application is based upon and claims the benefit of priority from Japanese patent application No. 2023-199767, filed on Nov. 27, 2023, the disclosure of which is incorporated herein in its entirety by reference.

BACKGROUND

The present disclosure relates to an actuator, and a robot, a brace, and a haptic device including the same.

A Twisted String Actuator (TSA) that converts a rotational motion into a linear motion by twisting a plurality of wires together is known. In Patent Literature 1, such an actuator is used as a drive source for driving a joint of a robot hand.

Patent Literature 1: U.S. Pat. No. 4,843,921

SUMMARY

The inventor has found the following problem regarding the actuator disclosed in Patent Literature 1. In this actuator, when the number of rotations of twisting of wires is increased in order to increase the amount of stroke, a state referred to as an over-twisting occurs in which the twisted wires are twisted into a coil shape. When an over-twisting has occurred, fluctuations in the stroke and the torque for the rotation become unstable, and thus the actuator cannot be controlled. Therefore, there has been a demand for an actuator by which a large amount of stroke can be obtained without an over-twisting occurring.

The present disclosure has been made in view of the above-described circumstances, and an object thereof is to provide an actuator by which a larger amount of stroke can be obtained without an over-twisting occurring.

An actuator according to an aspect of the present disclosure includes:

a plurality of wires, one end of each wire of the plurality of wires being engaged with a load;

a support member, another end of each wire of the plurality of wires being fixed to the support member; and a drive source configured to rotate the support member, to thereby twist the plurality of wires together, the actuator being configured to change a distance between the support member and the load in accordance with the rotation of the support member, in which each of the plurality of wires is fixed to the support member in a state in which the plurality of wires are twisted in advance in the same twist rotation direction, and when the distance between the support member and the load is reduced, the plurality of wires are rotated in a rotation direction the same as the twist rotation direction and then twisted together.

In the actuator according to one aspect of the present disclosure, each of the plurality of wires is fixed to the support member in a state in which the plurality of wires are twisted in advance in the same twist rotation direction. Further, when a distance between the support member and the load is reduced, the plurality of wires are rotated in a rotation direction the same as the twist rotation direction and then twisted together. By this configuration, a larger amount of stroke is obtained without an over-twisting occurring in the plurality of wires.

A position where the distance between the support member and the load is maximized by rotating the plurality of wires in a direction opposite to the twist rotation direction and then twisting them together from a state in which the plurality of wires are not being twisted together may be set as an operation starting point. By this configuration, an even larger amount of stroke can be obtained.

Each of the plurality of wires may be formed of ultra-high molecular weight polyethylene. By this configuration, the strength of the wire can be increased.

Each of the plurality of wires may be a stranded wire in which a plurality of element wires are twisted together. By this configuration, the strength of the wire can be increased.

A robot according to the present disclosure may be a robot configured so that joints of the robot are driven by the actuator according to the present disclosure.

A brace according to the present disclosure may be a brace worn by a person and configured to assist movement of joints of the person, the brace being driven by the actuator according to the present disclosure.

A haptic device according to the present disclosure may be a haptic device worn by a person and configured to provide a virtual sense of touch to the person, the haptic device being driven by the actuator according to the present disclosure.

According to the present disclosure, it is possible to provide an actuator by which a larger amount of stroke can be obtained without an over-twisting occurring.

The above and other objects, features and advantages of the present disclosure will become more fully understood from the detailed description given hereinbelow and the accompanying drawings.

DESCRIPTION OF EMBODIMENTS

Specific embodiments to which the present disclosure is applied will be described hereinafter in detail with reference to the drawings. However, the present disclosure is not limited to the following embodiments. Further, for the clarification of the description, the following descriptions and the drawings are simplified as appropriate.

First Embodiment

<Configuration of Actuator>

First, an actuator according to a first embodiment will be described with reference to FIG. 1.

Figure 1:
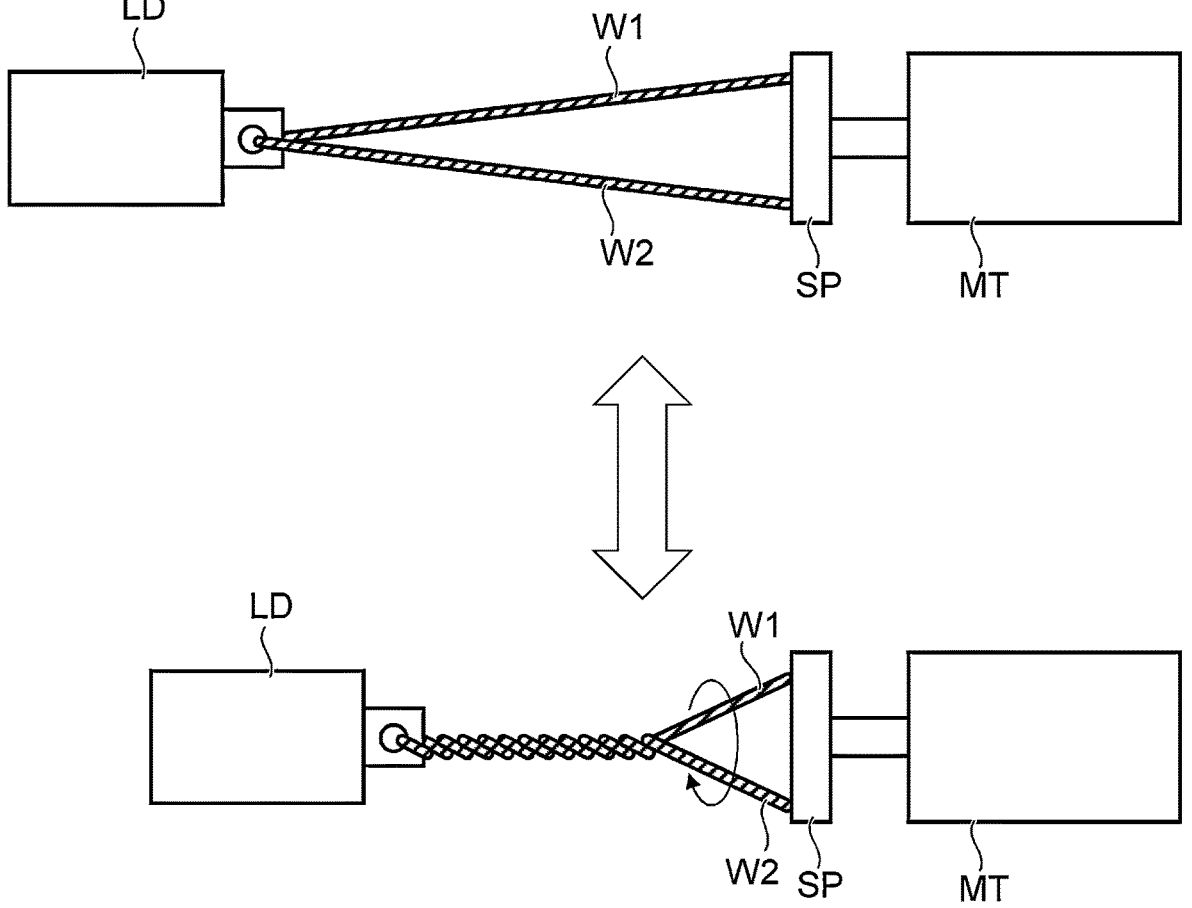
FIG. 1 is a side view schematically showing a configuration of an actuator according to a first embodiment.

FIG. 1 is a side view schematically showing the configuration of the actuator according to the first embodiment. As shown in FIG. 1, the actuator according to this embodiment includes a pair of wires W1 and W2, a support member SP, and a motor MT.

As shown in FIG. 1, in the actuator, the support member SP is rotationally driven by the motor MT, and the wires W1 and W2 are twisted together, whereby a distance between the support member SP and a load LD is changed. That is, the actuator according to this embodiment is one form of a twisted string actuator.

For example, the actuator according to this embodiment drives the joints of a robot. The actuator may drive a brace which is worn by a person and assists movement of the joints of the person. Alternatively, the actuator may drive a haptic device which is worn by a person and provides a virtual sense of touch to the person.

As shown in FIG. 1, one end of each wire of the pair of wires W1 and W2 is engaged with the load LD. Note that the engagement includes fixation. In the example shown in FIG. 1, the pair of wires W1 and W2 twisted together are one wire inserted into a through-hole provided at an end part of the load LD. Meanwhile, the other end of each wire of the pair of wires W1 and W2 is fixed to the support member SP.

The pair of wires W1 and W2 are, for example, wires made of resin. More specifically, the wires W1 and W2 are made of, for example, ultra-high molecular weight polyethylene having an excellent strength. By the above configuration, the strength of the wires W1 and W2 can be increased.

As a matter of course, the pair of wires W1 and W2 may be wires different from each other. Further, the number of wires twisted together is not limited to two, and may instead be three or more. Further, each of the wires W1 and W2 may be a stranded wire in which a plurality of wires are twisted together. By the above configuration, the strength of the wires W1 and W2 can be increased.

As described above, the support member SP supports the other end of each wire of the pair of wires W1 and W2. The support member SP is connected to the rotation shaft of the motor MT and is rotationally driven by the motor MT. When the support member SP is rotated in the direction indicated by the arrow shown in the lower side of FIG. 1 in the state shown in the upper side of FIG. 1, the wires W1 and W2 are twisted together and the distance between the support member SP and the load LD is reduced. That is, the load LD is pulled toward the support member SP and comes closer to the support member SP.

On the contrary, when the support member SP is rotated in the direction opposite to the direction indicated by the arrow in the state shown in the lower side of FIG. 1, the twisted wires W1 and W2 are untwisted and the distance between the support member SP and the load LD increases as shown in the upper side of FIG. 1. That is, the load LD moves away from the support member SP.

The motor MT is a drive source for rotating the support member SP and then twisting the wires W1 and W2 together. The motor MT is driven based on a control signal output from a motor control unit (not shown). The motor control unit includes, for example, an arithmetic unit such as a Central Processing Unit (CPU), and a storage unit such as a Random Access Memory (RAM) and a Read Only Memory (ROM) that store various control programs, data, and the like. The control signal is, for example, a Pulse Width Modulation (PWM) signal.

Note that the drive source for rotationally driving the support member SP is not limited to the motor MT, and may instead be, for example, an engine.

In the actuator according to this embodiment, both of the wires W1 and W2 are fixed to the support member SP in a state in which they are twisted in the same twist rotation direction in advance. Further, when the distance between the support member SP and the load LD is reduced, the wires W1 and W2 are rotated in a rotation direction the same as the twist rotation direction and then twisted together. As will be described in detail later, by the above configuration, a larger amount of stroke can be obtained without an over-twisting occurring in the wires W1 and W2.

In the following description, twisting the wires W1 and W2 in advance in order to fix them to the support member SP is referred to as pre-twisting.

Further, in the actuator according to this embodiment, when the wires W1 and W2 are rotated by a certain amount in the rotation direction opposite to a direction in which the wires W1 and W2 are pre-twisted from a state in which the wires W1 and W2 are not being twisted together, the distance between the support member SP and the load LD is maximized. Therefore, by setting this position as an operation starting point, a stroke that is effective (hereinafter referred to as an effective stroke) can be increased.

Further, as will be described in detail later, in the actuator according to this embodiment, the reduction ratio of the actuator can be easily changed by changing the amount of pre-twisting of the wires W1 and W2.

EXAMPLE

Examples and comparative examples of the actuator according to the first embodiment will be described below. However, the actuator according to the first embodiment is not limited to the following Examples.

Example 1

Stranded wires obtained by twisting two element wires together were used as the wires W1 and W2. A fishing line made of ultra-high molecular weight polyethylene having an overall length of 100 mm and a diameter of 0.47 mm was used as each of the element wires. The twist amount of twisting of the element wires in the wires W1 and W2 was set to 34 rotations and the twist pitch was set to 2.9 mm. This twist amount of twisting of the element wires is the amount of pre-twisting of the wires W1 and W2. Here, for the sake of convenience, the amount of pre-twisting in Example 1 is set to 100%.

A stroke (a positive direction stroke) without an over-twisting occurring was obtained by rotating the wires W1 and W2 in a rotation direction the same as a direction in which the wires W1 and W2 are pre-twisted and then twisting them together from a state in which the wires W1 and W2 are not being twisted together. On the contrary, a stroke (a negative direction stroke) without an over-twisting occurring was obtained by rotating the wires W1 and W2 in a rotation direction opposite to a direction in which the wires W1 and W2 are pre-twisted and then twisting them together from a state in which the wires W1 and W2 are not being twisted together.

Figure 2:
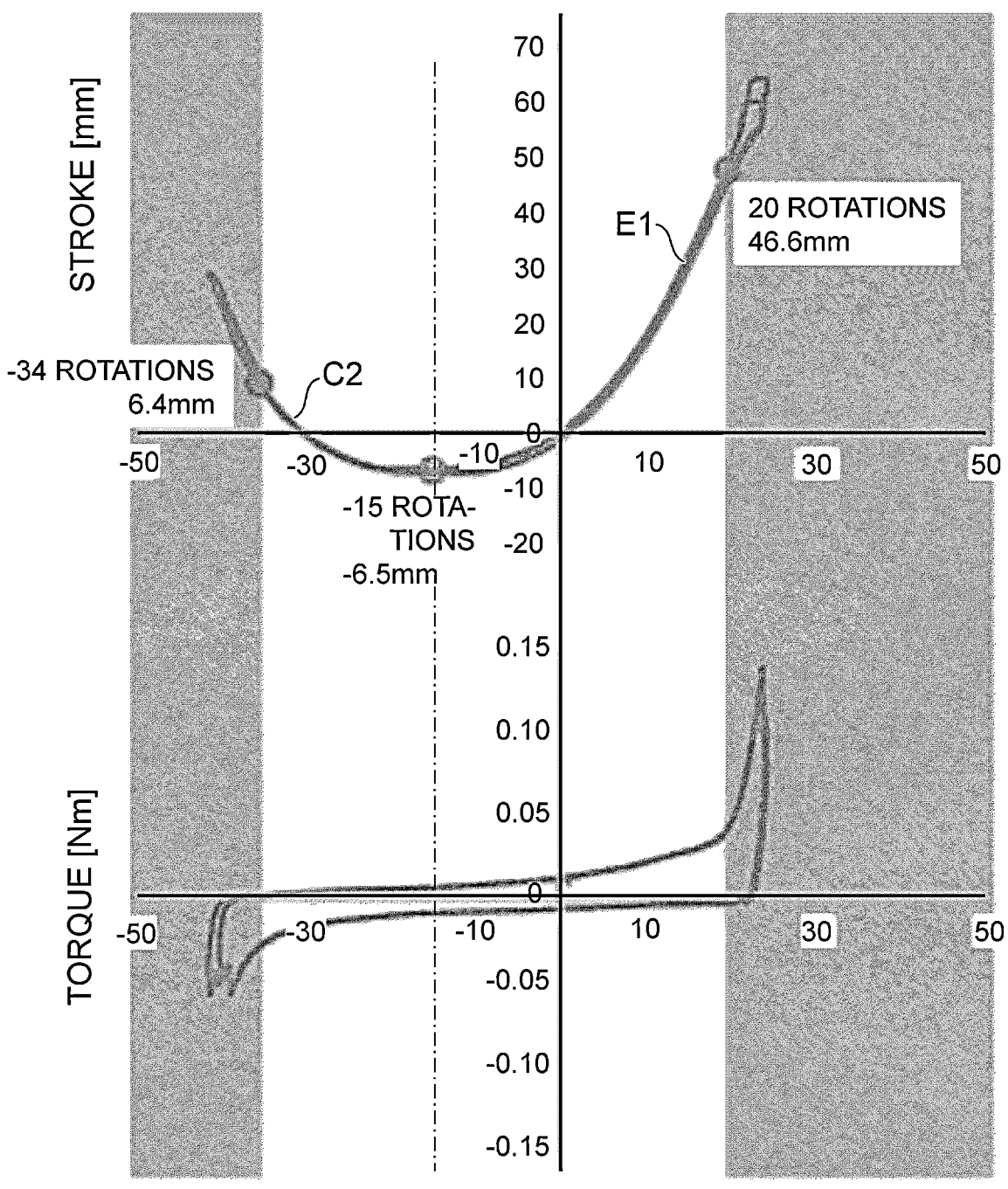
FIG. 2 is a graph showing changes in the stroke and torque with respect to the number of rotations of twisting of wires W1 and W2 in Example 1.

FIG. 2 is a graph showing changes in the stroke and torque with respect to the number of rotations of twisting of the wires W1 and W2 in Example 1. The horizontal axis in FIG. 2 indicates the number of rotations (times) of the twisting. Note that the number of rotations (rotations in the positive direction) of the wires W1 and W2 in a rotation direction the same as a direction in which the wires W1 and W2 are pre-twisted is indicated by a positive value, while the number of rotations (rotations in the negative direction) of the wires W1 and W2 in a rotation direction opposite to a direction in which the wires W1 and W2 are pre-twisted is indicated by a negative value.

The vertical axis on the upper side of FIG. 2 indicates the stroke (mm), while the vertical axis on the lower side of FIG. 2 indicates the torque (Nm).

As shown in FIG. 2, the positive direction stroke without an over-twisting occurring was 46.6 mm at 20 rotations. On the contrary, the negative direction stroke without an over-twisting occurring was 6.4 mm at −34 rotations.

Note that, as shown in FIG. 2, a peak of the stroke of −6.5 mm occurred at −15 rotations.

Therefore, in Example 1, an effective stroke of 53.1 mm can be obtained by setting −15 rotations as an operation starting point.

Note that, as shown in FIG. 2, when an over-twisting has occurred, hysteresis occurs in the stroke and fluctuations in the torque becomes unstable. Further, as shown in FIG. 2, with respect to −15 rotations set as an operation starting point indicated by a dot-and-dash line, a rotation in the positive direction is Example 1 (E1 shown in FIG. 2), and a rotation in the negative direction is a comparative example. This comparative example is referred to as Comparative Example 2 (C2 shown in FIG. 2). That is, in Example 1,

Example 2

Example 2 is similar to Example 1 except that the twist amount of twisting of the element wires in the wires W1 and W2 was set to 24.5 rotations and the twist pitch was set to 4.1 mm. The amount of pre-twisting in Example 2 is 72%.

In Example 2, the positive direction stroke without an over-twisting occurring was 37.5 mm at 21 rotations. On the contrary, the negative direction stroke without an over-twisting occurring was 17.5 mm at −33.5 rotations.

Note that the peak of the stroke of −3.5 mm occurred at −10 rotations.

Therefore, in Example 2, an effective stroke of 41.0 mm can be obtained by setting −10 rotations as an operation starting point.

Example 3

Example 3 is similar to Example 1 except that the twist amount of twisting of the element wires in the wires W1 and W2 was set to 19.5 rotations and the twist pitch was set to 5.1 mm. The amount of pre-twisting in Example 3 is 57%.

In Example 3, the positive direction stroke without an over-twisting occurring was 37.0 mm at 22 rotations. On the contrary, the negative direction stroke without an over-twisting occurring was 21.0 mm at −33 rotations.

Note that the peak of the stroke of −2.5 mm occurred at −7.5 rotations.

Therefore, in Example 3, an effective stroke of 39.5 mm can be obtained by setting −7.5 rotations as an operation starting point.

Example 4

Example 4 is similar to Example 1 except that the twist amount of twisting of the element wires in the wires W1 and W2 was set to 7 rotations and the twist pitch was set to 14.3 mm. The amount of pre-twisting in Example 4 is 21%.

In Example 4, the positive direction stroke without an over-twisting occurring was 35.0 mm at 26 rotations. On the contrary, the negative direction stroke without an over-twisting occurring was 34.0 mm at −32.5 rotations.

Note that the peak of the stroke of −0.5 mm occurred at −4 rotations.

Therefore, in Example 4, the effective stroke of 35.5 mm can be obtained by setting −4 rotations as an operation starting point.

Comparative Example 1

Comparative Example 1 is similar to Example 1 except that two element wires in the wires W1 and W2 were used without twisting them together. The amount of pre-twisting in Comparative Example 1 is 0%.

Figure 3:
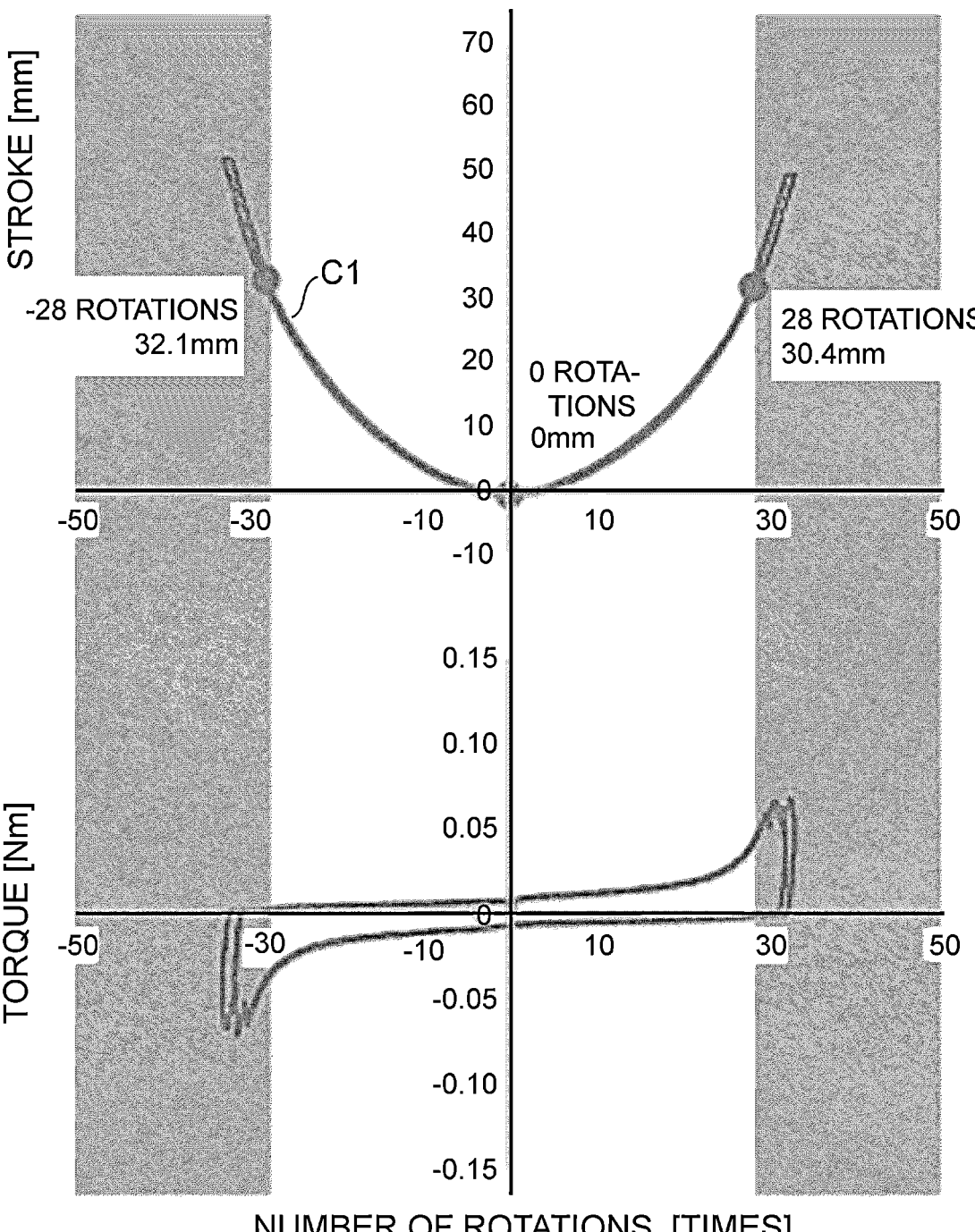
FIG. 3 is a graph showing changes in the stroke and torque with respect to the number of rotations of twisting of the wires W1 and W2 in Comparative Example 1.

FIG. 3 is a graph showing changes in the stroke and torque with respect to the number of rotations of twisting of the wires W1 and W2 in Comparative Example 1. The horizontal axis in FIG. 3 indicates the number of rotations (times) of the twisting. The vertical axis on the upper side of FIG. 3 indicates the stroke (mm), while the vertical axis on the lower side of FIG. 3 indicates the torque (Nm).

As shown in FIG. 3, the positive direction stroke without an over-twisting occurring was 30.4 mm at 28 rotations. On the contrary, the negative direction stroke without an over-twisting occurring was 32.1 mm at −28 rotations.

Note that, as shown in FIG. 3, in Comparative Example 1, the stroke at 0 rotations is minimum at 0 mm, and the peak of the negative stroke does not occur.

Therefore, in Comparative Example 1, an effective stroke of 30.4 mm (or 32.1) can be obtained by setting 0 rotations as an operation starting point.

In Comparative Example 1 shown in FIG. 3, the dependence of the stroke and the torque on the number of rotations is symmetric about 0 rotations, that is, the y-axis, as the central axis. On the contrary, in Example 1 and Comparative Example 2 shown in FIG. 2, the dependence of the stroke and the torque on the number of rotations is asymmetric about −15 rotations indicated by a dot-and-dash line as the central axis. Specifically, as shown in FIG. 2, in Example 1 in which the wires are rotated in the positive direction with respect to −15 rotations, the effective stroke is larger than that in Comparative Example 1, while in Comparative Example 2 in which the wires are rotated in the negative direction with respect to −15 rotations, the effective stroke is smaller than that in Comparative Example 1.

Figure 4:
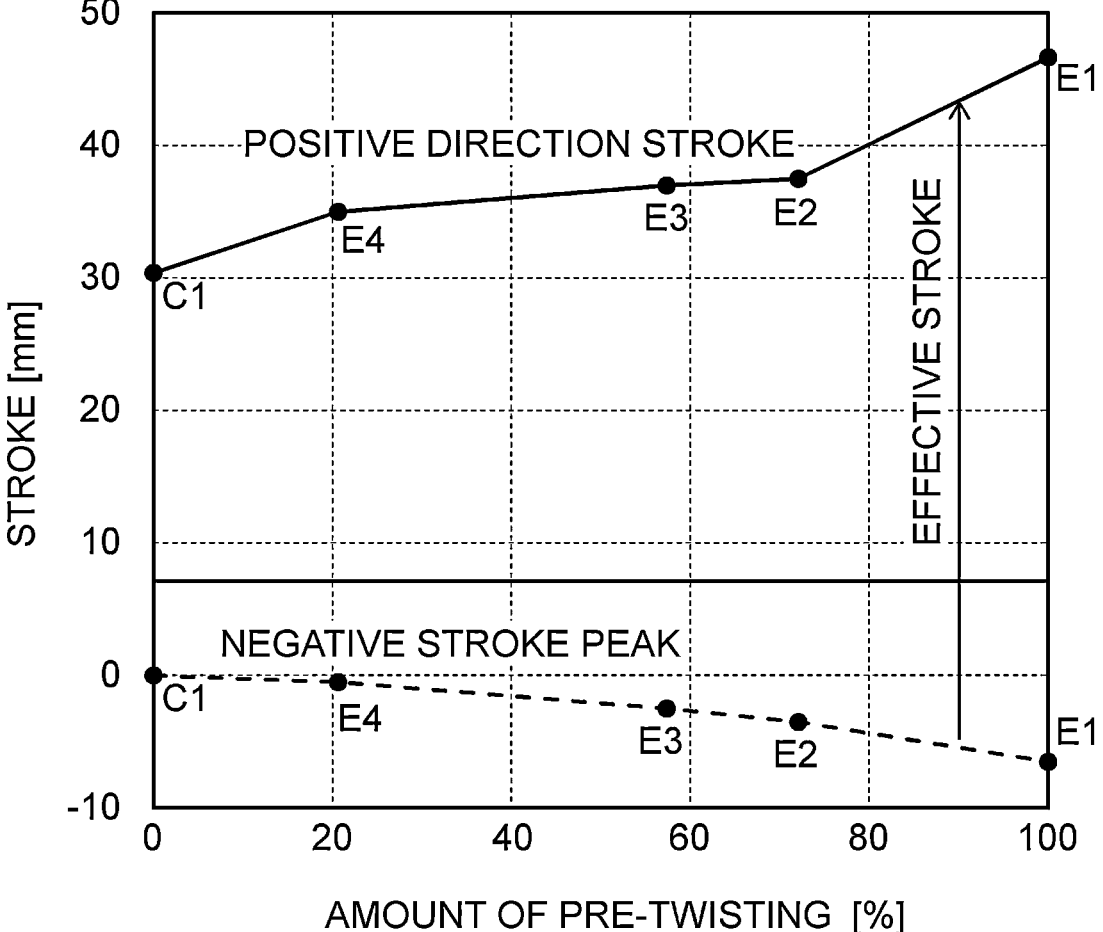
FIG. 4 is a graph showing changes in the effective stroke with respect to the amount of pre-twisting.

In FIG. 4, the positive direction strokes, the negative stroke peaks, and the effective strokes of Examples 1 to 4 and Comparative Example 1 are summarized. FIG. 4 is a graph showing changes in the effective stroke with respect to the amount of pre-twisting. In FIG. 4, the horizontal axis indicates the amount of pre-twisting (%), while the vertical axis indicates the stroke (mm). In FIG. 4, Examples 1 to 4 are denoted by E1 to E4, respectively, while Comparative Example 1 is denoted by C1.

As shown in FIG. 4, in each of Examples 1 to 4, the effective stroke without an over-twisting occurring was larger than that in Comparative Example 1. Further, as the amount of pre-twisting became larger, the positive direction stroke and the negative stroke peak became larger, and as a result, the effective stroke also became larger.

Figure 5:
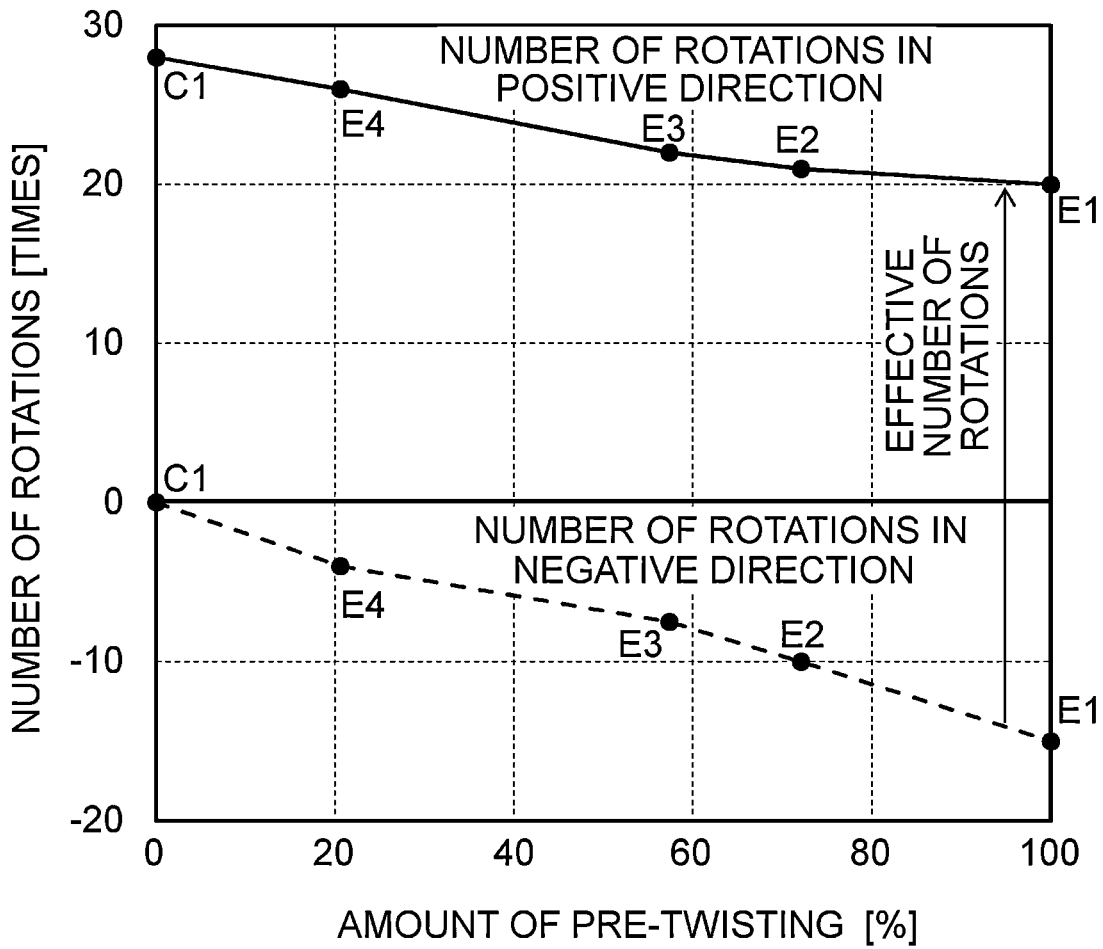
FIG. 5 is a graph showing changes in the effective number of rotations with respect to the amount of pre-twisting.

Next, in FIG. 5, the number of rotations corresponding to the positive direction strokes and the negative stroke peaks shown in Examples 1 to 4 and Comparative Example 1 of 7 8

FIG. 4 is summarized. FIG. 5 is a graph showing changes in the effective number of rotations with respect to the amount of pre-twisting. In FIG. 5, the horizontal axis indicates the amount of pre-twisting (%), while the vertical axis indicates the number of rotations (times). The effective number of rotations is the number of rotations corresponding to the effective stroke.

As shown in FIG. 5, as the amount of pre-twisting becomes larger, the number of rotations corresponding to the positive direction stroke becomes smaller. On the contrary, as the amount of pre-twisting becomes larger, the number of rotations corresponding to the negative stroke peak shifts in the negative direction. Note that the amount of shift in the number of rotations corresponding to the negative stroke peak in the negative direction was larger than the amount of decrease in the number of rotations corresponding to the positive direction stroke, and therefore, the effective number of rotations became large as the amount of pre-twisting became larger.

Figure 6:
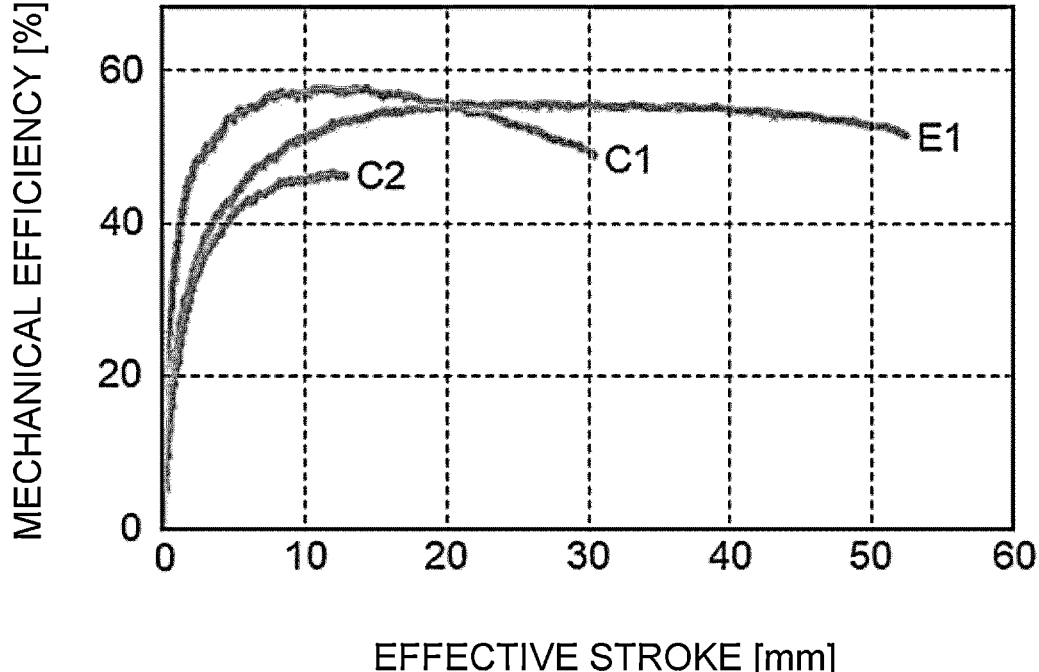
FIG. 6 is a graph showing changes in the mechanical efficiency with respect to the effective stroke in Example 1 and Comparative Example 2 shown in FIG. 2 and Comparative Example 1 shown in FIG. 3.

Next, FIG. 6 is a graph showing changes in the mechanical efficiency with respect to the effective stroke in Example 1 and Comparative Example 2 shown in FIG. 2 and Comparative Example 1 shown in FIG. 3. In FIG. 6, the horizontal axis indicates the effective stroke (mm), while the vertical axis indicates the mechanical efficiency (%). Note that Example 1 is E1 in FIG. 2, and is a case in which the wires were rotated in the positive direction with respect to −15 rotations indicated by a dot-and-dash line in FIG. 2. Comparative Example 2 is C2 in FIG. 2, and is a case in which the wires were rotated in the negative direction with respect to −15 rotations indicated by a dot-and-dash line in FIG. 2.

As shown in FIG. 6, in Comparative Example 2, not only is the maximum value of the effective stroke 12.9 mm, that is, 12.9% (=12.9 mm/100 mm×100), but also the mechanical efficiency is low.

The mechanical efficiency in Comparative Example 1 shows a peak at the effective stroke of about 10 mm, that is, 10%, and then gradually decreases. Further, when the effective stroke is 20 mm or more, the mechanical efficiency in Comparative Example 1 falls below that in Example 1. The maximum value of the effective stroke in Example 1 is 30.4 mm, that is, 30.4%.

On the contrary, as shown in FIG. 6, in Example 1, not only is the maximum value of the effective stroke large, which maximum value is 53.1 mm, that is, 53.1%, but also the mechanical efficiency is stably maintained at a high value when the effective stroke is 20 mm or more. As described above, it has been found that, in Example 1, the maximum value of the effective stroke is excellently large, and moreover, the mechanical efficiency is excellent.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An actuator comprising:

a plurality of wires, one end of each wire of the plurality of wires being engaged with a load;

a support member, another end of each wire of the plurality of wires being fixed to the support member; and a drive source configured to rotate the support member to thereby twist the plurality of wires together, wherein:

the actuator is configured to change, in accordance with the rotation of the support member, a spacing between the support member and the load between at least (i) a first distance, (ii) a second distance at which the spacing between the support member and the load is less than the first distance, (iii) a third distance at which the spacing between the support member and the load is greater than the first distance, and (iv) an operation starting distance at which the spacing between the support member and the load is greatest;

when the spacing is at the first distance, the plurality of wires are twisted together in a first twist rotation direction;

when the spacing is at the second distance, the plurality of wires are further twisted together in the first twist rotation direction;

when the spacing is at the third distance, the plurality of wires are not twisted together but each wire of the plurality of wires is itself individually twisted in the first twist rotation direction; and when the spacing is at the operation starting distance, the plurality of wires are twisted together in a second twist rotation direction opposite to the first twist rotation direction.

2. The actuator according to claim 1, wherein each of the plurality of wires is formed of ultra-high molecular weight polyethylene.

3. The actuator according to claim 1, wherein each of the plurality of wires is a stranded wire in which a plurality of element wires are twisted together in the first twist rotation direction.

4. A robot comprising:

the actuator according to claim 1; and joints driven by the actuator.

5. The actuator according to claim 1, configured to drive a brace to assist movement of joints of a person wearing the brace.

6. The actuator according to claim 1, configured to drive a haptic device to provide a virtual sense of touch to a person wearing the haptic device.

\* \* \* \* \*